3,094,913
REFLEX PHOTOGRAPHIC APPARATUS WITH SINGLE OBJECT-LENS, WITH IMPROVED SYNCHRONIZED CONTROL AND COUPLING MECHANISM
Jules Louis Eugene Morelle, Paris, France, assignor to Optique et Precision de Levallois, Levallois-Perret, France, a company of France
Filed Jan. 5, 1960, Ser. No. 527
Claims priority, application France Jan. 16, 1959
11 Claims. (Cl. 95—42)

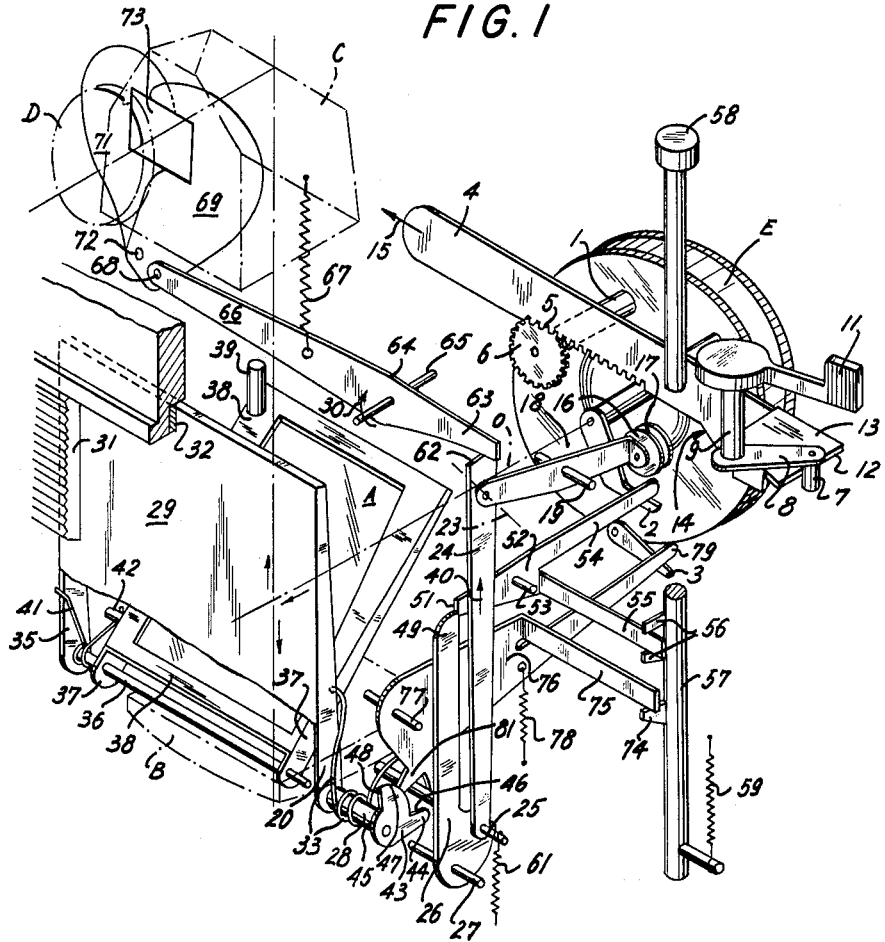

The object of the present invention relates especially to the mechanical control of the complex operations which take place automatically when the operator arms the apparatus and when he actuates the release for taking a picture, in a reflex single-lens apparatus with a central shutter and a diaphragm of the automatic pre-selection type comprising in particular, a rectifying view-finder device forming the object of the application made in U.S.A. by the present applicant on September 3, 1959, under No. 837,833.

This device effects the coupling of the parts which control the special rocking action of the semi-transparent mirror to the parts which actuate the shutter mechanism of the pre-selection diaphragm of the view-finder eye-piece shutter-flap and the protection mechanism of the sensitive surface between the exposures, these operations being initiated and carried into effect in the intended order and time delays by the action of the operator, when the latter acts at the required moments on the film-winding control, thereby arming the shutter at the shame time, and on the exposure-release respectively.

A device of this kind is illustrated diagrammatically in the accompanying drawings, which are given by way of example only and not in any sense by way of limitation.

FIG. 1 is a view taken roughly in perspective of the complex mechanical unit forming the object of the present invention, the contours of the known optical parts such as the field lens B, the roof prism C and the eye-piece lens D which co-operate, for view-finding, with the semi-transparent mirror A in accordance with the above-mentioned patent, are shown diagrammatically in chain-dotter lines.

FIGS. 2, 3 and 4 are partial diagrams of this mechanism.

In FIG. 1, for the sake of clarity of the diagram, no parts of the apparatus have been shown which do not directly concern the device of the present application and which are of known type, such as those parts which co-operate with the arming lever for the winding and housing of the film, for its passage or for its guiding, etc.; neither have there been shown the fixed parts of the body of the apparatus in order not to complicate the drawing unduly.

The object-lens shutter employed, which is of known type, has a mechanism which is not shown in the drawings and which is contained in a casing E, out of the rear of which there pass into the dark chamber of the apparatus (the casing in particular of said dark chamber not being shown in the diagram): the shutter-arming shaft 1 which, at the end of the arming action, opens wide the diaphragm and the shutter itself; the shaft of a lever 2 releasing the automatic return of the blades of the diaphragm towards the closure, said shaft being stopped at the pre-selected opening indicated, and, the shaft of a shutter-release lever 3 for taking the picture. All these mechanisms are of known type and are neither described nor illustrated for this reason.

The device of the present invention serves to carry out, in the proper order and with regulated synchronization, the movements of the members according to the cycle of operation which is special to this type of apparatus, namely:

When arming, by operating the single arming lever:
(a) Setting the view-finding mirror in position at 45°;
(b) Closing of the image window;
(c) Opening of the eyepiece shutter of the view-finder;
(d) Arming and opening of the object-lens shutter;
(e) Setting of the diaphragm to its fully-open position.

When releasing, by the action of the operator on the single release control:
(f) Closure of the object-lens shutter and moving of the diaphragm to the opening indicated;
(g) Closure of the eye-piece shutter;
(h) Displacement of the mirror at 45° away from the field of the object-lens;
(i) Opening of the image window and disengagement of the field of the object-lens by the shutter flap;
(j) Operation of the shutter for the exposure time indicated.

These two sequences of operation are those required for a single-lens reflex with semi-transparent mirror, which is pivoted beneath and to the rear of the object-lens so as to permit of its displacement, and which co-operates with a lower collector-lens having a convex silvered face to send the light rays upwards through the semi-transparent flat mirror, said light rays being diverted by an Amici roof prism mounted at the top of the apparatus, then passing out at the rear of the prism, through the eye-lens of an eye-piece, the axis of which is parallel to the optical axis of the object-lens, for the purpose of observing a straight and non-inverted image which is exactly similar to the image which will be focussed on the sensitive film.

In this particular type of apparatus, the image window is provided with an opaque shutter flap which rotates about the same shaft as the flat mirror, said shaft being beneath and to the rear of the object-lens. This flap can be applied against this window so as to close said window during the period of time prior to taking a picture, in which light is admitted into the chamber of the apparatus so as to permit view-finding. An eye-piece shutter in this type of apparatus should be open during the same period and closed at the moment of taking the picture.

In the example which is illustrated diagrammatically in FIGS. 1 to 4, there is provided in addition to the parts referred to above, an arming sliding member or connecting-rod 4 comprising an elongated, flat body having a generally rectangular shape and carrying on its lower edge, for example, a toothed rack 5 which engages with a pinion 6 keyed on the shaft 1.

The said connecting-rod 4 can move horizontally and perpendicularly to the optical axis O of the object-lens. The rod is guided in the apparatus by means which are not shown in the drawing. It responds to the action of a finger 7 of a crank 8 keyed on the vertical shaft 9 of the arming lever 11 which, by means of other members which are not shown, controls at the same time the winding of the film in known manner.

The finger 7 drives the edge 12 of a horizontal portion 13 of the connecting-rod 4 which is folded back at its extremity.

Between the rack by and the said extremity, the connecting-rod 4 is provided with a sloping section 14, inclined to the horizontal.

When the lever 11 is actuated in order to advance the film by the length of one image, the connecting-rod 4 is displaced in the direction of the arrow 15 and when the said lever returns to its position of rest, the connecting-rod 4 is returned in the reverse direction towards the finger 7 by means of a spring which is under continuous tension, but which is not shown in the drawing.

When it is displaced in the direction 15, the tooth rack 5 causes the pinion 6 to rotate with the shaft 1. This movement of rotation effects in a known manner, firstly the setting of the shutter and, at the end of its travel, the full opening of the diaphragm and the opening of the shutter so as to permit view-finding to be effected.

When the connecting-rod 4 returns to its position of rest, at the same time as the arming lever 11 is released, the backwards rotation of the said shaft 1 is effected freely, while the shutter remains armed and open at its position of maximum opening.

During the advance of the connecting-rod 4 in the direction 15, the sloping section 14 forces down the extremity of a lever 18 which is capable of rotating about a fixed shaft 19, parallel to the displacement of the connecting-rod 4.

It follows from this arrangement that the contact between the lever and the sloping section is displaced in the direction of the length of said lever; this would cause friction and reactions which would adversely affect the proper operation of these members, which should be as light and compact as possible in photographic apparatus having mechanisms of this type.

In order to overcome this drawback, and in accordance with one of the characteristic features of the device, the extremity of the lever 18 is provided with a roller 16 having a groove 17 in which the contact of the sloping section 14 takes place.

This roller 16 is capable of rotating freely on a shaft 21 fixed on a lug 22 at the end of the lever 18. The shaft 21, which is perpendicular to the shaft 19 of the lever 18, can be sloping with respect to the general direction of the lever arm, in such manner as to limit and distribute in the best possible manner the relative angles of inclination of the sloping section 14 and the transverse displacements of its contact in the groove 17. The sloping section 14 could preferably be provided with a rounded transverse contact profile.

The other extremity of the lever 18 opposite to the roller 16 with respect to the shaft 19 is pivotally mounted about a moving shaft 23 on a connecting-rod 24. This connecting-rod 24 is pivotally mounted at its lower extremity on a shaft 25, parallel to the preceding shafts 23 and 19, said shafts 25 passing through an elbowed lever 26 to which it is fixed, said lever 26 being pivoted about a fixed shaft 27 parallel to the previous shafts and to the lower side of the image window 31. A characteristic feature of this shaft 27 is that it is located at the bottom of the apparatus in a plane in the vicinity of that of said window 31 and beneath this latter. In the extension of said shaft 27 there is disposed a shaft 28 which is rigidly fixed for rotation to one of the arms 20 of an opaque flap 29 which can be applied to close the front of the image window 31 the latter permitting of the arrival on the film, not shown in the drawing and passing behind said window in known manner, of the light rays which, after passing through the object-lens, are focussed on said film so as to form the images.

The periphery of the said window 31 is lined with a light-excluding felt 32, on which the flap 29 is firmly applied under the action of a spring 33 of piano wire when said flap 29 is freed, said spring 33 being wound round the shaft 28 and having one of its extremities applied against the upright 20 of the flap 29 so as to cause said flap to rotate towards the image window 31 and to apply the flap against the lining 32, the other end of said spring 33 being supported by an extension 34 of the shaft 25. The other arm 35 of the flap 29 rotates about a fixed shaft 36 mounted co-axially in the line of extension of the shafts 27 and 28 on which rotate the arms 37 of the frame 38 forming a support for the plate A with parallel faces which forms a semi-reflecting mirror. The internal face of this plate mirror A which reflects downwards the light rays passing through the object-lens during the view-finding operation, passes, for example through the axis of rotation 36.

The mirror A is stopped at an angle of slope of 45° with respect to the optical axis O by the contact between the frame 38 of said mirror and a stop 39 fixed in the apparatus.

The mirror A rotates freely about the shaft 36 and is constantly urged towards the flap 29 by a spring 41 which is wound round 36, the extremities of the arms of said spring being supported at one end by the arm 35 of the flap 29 and at the other end by a pin 42 formed on the side of the frame 38, thus drawing one towards the other.

The spring 33 which raises the flap 29 also serves to raise the frame 38 of the mirror A, which is constantly urged towards said flap by the force of the spring 41 which remains at all times less than the force of the spring 33.

When the frame 38 is stopped by the abutment 39, in spite of the opposing action of the spring 41, the lifting of the flap 29 continues until this latter is applied against the lining 32 to close the image frame 31.

The downward rotation of the flap 29, so as to open the image window 31 and to free the passage of the light rays when taking a picture, also drives in rotation the frame 38 of the mirror A which is applied against the frame under the action of the spring 41, the two parts being turned down on top of the collector-plate B.

This downward rotation of the flap 29 which is in opposition to the action of the spring 33, is controlled by the rotation of a cam 43 which is keyed on the shaft 28 and rigidly fixed for rotation with the flap 29.

The cam 43 is provided with a finger 44 with which is engaged, so as to drive the flap 29 in rotation, the rod 34 which rotates with the elbowed lever 26 about the shaft 27, when the connecting-rod 24 moves downwards under the action of a spring 61 which constantly urges the said connecting-rod towards the bottom.

The cam 43 is provided with a circular portion 45 having a small radius, the centre of said circular portion being approximately opposite the finger 44 and on a same diameter as the radial portion 46 of said finger which co-operates with the rod 34.

Between this radial portion 46 and the said circular portion 45, the cam has a circular portion 47 having a larger radius, which is coupled to the base of the finger 44 and terminates abruptly in a shoulder having a radius 48 up to the arc of circumference 45 of small radius.

The elbowed lever 26 has a large arm 49 the extremity of which comes up against the extremity 51 of a rocking lever 52 capable of pivoting about a fixed shaft 53 parallel to the shaft 19, the arm 54 of said rocking lever, opposite to that which terminates at 51 with respect to the shaft 53 can, when lowered, actuate the lever 2 controlling the release of the automatic closure of the diaphragm.

On the same side of the shaft 53 as the arm 54, the rocking lever 52 is provided with a horizontal arm 55 which is bent back at 90° and extends between fingers 56 having the shape of a fork and fixed on a vertical rod 57 which is guided in the apparatus and passes beyond the casing of this latter, the said rod terminating in the picture-taking release-button 58.

The rod 57 is constantly urged upward to its position of rest by a spring 59 and its upward movement raises the arm 55, which is held in the fork 56, to its upper position. The movements of the arm 55 cause rotation of the lever 52 which carries the said arm and the lifting of this latter brings the extremity 51 to its bottom position, in which it comes up against the extremity of the large arm 49 of the elbowed lever 26. The movement of rotation of the lever 26 is carried out under the tractive force of a spring 61 which constantly draws the connecting-rod 24 downwards and is limited by the abutment of the said extremity 51 against the extremity of the said large arm 49.

The upper edge 62 of this connecting-rod 24 drives in rotation, while in abutment against its extremity 63, a lever 64 pivoted about a fixed shaft 65 parallel to the optical axis O, which controls the shutter action of the eyepiece, the incorporation of this latter being one of the special features of the present application and will be described hereunder. The said lever 64 is constantly urged by a spring 67 to rotate in the direction of the arrow 30 when permitted to do so by the downward movement of the connecting-rod 24. At its extremity 66 opposite to 63, the said lever drives by means of a pivotal mounting 68 a first flap 69 of the shutter of the eye-piece D which rotates about an axis 72 and drives by means of known couplings, not shown in the drawing, the second flap 71 of said shutter. When the lever 64 is free to rotate in the direction 30 as a result of the downward movement of the connecting-rod 24, the movement of rotation of the flaps 69 and 71 effects the closure of a window 73. This window, the opening of which is constituted by the formation of two hollowed-out portions, each of these opening into one of the flaps 69 and 71, is opened between the eye-piece D and the roof prism C, when the lever-arm 63 is lifted by the upward movement of the connecting-rod 24 in the direction of the arrow 40 by the rotation of the lever 18. The said window remains open as long as this connecting-rod 24 remains fixed in its top position.

The release rod 57 is provided beneath the fork 56 with a finger 74. A portion 75 of a lever 76 bent back at 90° comes in abutment against the said finger 74. The said lever 76 pivots about a fixed shaft 77 parallel to the shaft 28 and is constantly acted upon by a spring 78 so as to cause the free extremity of the bent-back portion 75 to be applied against the finger 74 the upward movement of which, induced by the spring 59, raises the arm 75 and the lever 76.

When as a result of pressure applied on the knob 58 by the operator, the rod 57 is lowered, the rotation of the lever 76 causes the front extremity 79 of this latter to actuate, by pressing on the lever 3, the release of the shutter for the time of exposure indicated for taking the picture.

When the apparatus is armed with its elements in the viewing position, the image window 31 being closed by the flap 29 and the lever 49 being in abutment against 51 as shown in FIG. 1, the lever 76 is immobilized in spite of the action of the spring 78, by the abutment of a heel-shaped projection 81 of the said lever, which then rests on the circular portion of the cam 43 having a large radius 47.

The cam 43 is not prevented from rotating by the pressure of the heel-shaped projection 81 on the circular portion 47. The rotation of said cam 43 and similarly, the rotation of the flap 29 which is rigidly fixed for rotation with the said cam, is controlled, in opposition to the tension of the spring 33, by the abutment of the rod 34 against the edge 46 of the finger 44 of the cam 43, when the lever 26 rotates under the action of the spring 61.

This movement of rotation, in spite of the spring 33, folds back the flap 29 against the frame 38 of the mirror A which is moved away from its abutment 39 and driven downwards by the flap 29, thus freeing the field of the object-lens.

At this moment, the radial extremity 48 of the circular face 47 of the portion 45 of small radius of the cam 43 permits of the rotation of the lever 76 by means of the withdrawal of the heel 81.

The operation which then takes place in the correct order of the various functions, can thus be summarized as follows:

When the apparatus is armed, the various members are in the positions shown diagrammatically in FIG. 1.

When the operator presses on the knob 58 he causes the rod 57 to be thrust downwards and, by means of the fork 56 of the said rod 57, thus produces rotation of the lever 52 which rests on the lever 2. The closure of the shutter, which remains armed, is effected and the travel of the closure of the pre-selective diaphragm which is wide open, is also commenced and is stopped in known manner by an abutment at the opening indicated which is suited to the exposure. At the same time, the lifting of the heel-shaped projection 51 frees the arm 49 of the lever 26 which rotates under the action of the spring 61 thus producing the downward movement of the crank rod 34 and that of the connecting-rod 24 which is pivotally mounted on the extremity of the rocker arm 18 which swings freely. The downward movement of the connecting-rod 24 permits of the rotation in the direction 30 of the lever 64 which effects the closure of the view-finder by means of the blades 69 and 71, thus preventing any light from entering.

At the same time, the rotation of the rod 34 together with the elbowed lever 26 about the shaft 27 of this latter, after covering a certain distance of travel, causes the cam 43 which actuates the flap 29 to be driven by the finger 44 as soon as the eye-piece and the obejct-lens are closed, as stated above. The flap 29 swings back on to the frame 38 of the mirror and drives the frame in its downward rotation so as to cover the collector-plate B and free the field to the rear of the object-lens.

When the freeing of the field corresponding to the opening of the image window is terminated, the end of the rotation of the cam 43 frees the heel-shaped projection 81 and permits of the rotation of the lever 76 which acuates the lever 3 thus releasing the shutter for the exposure of the film and ending the taking of the picture.

The apparatus is then disarmed and unable to take a picture without previous operation. When the operator ceases to press on the knob 58, the upward movement of the rod 57 under the action of its spring 59 produces the upward movement of the lever 76 in spite of its spring 78, and with the freeing of the lever 3 of the shutter release, effects the upward movement into the position of abutment of the lever 52 which frees the lever 2 of the diaphragm closure release.

In spite of this upward movement of the rod 57, the rocker arm 18 remains in the raised position and the connecting-rod remains in the lowered position due to the tractive pull of the spring 61 and also due to the lever 26, the arm 49 of which remains beneath the arm of the lever 52, as shown in FIG. 2. The crank rod 34 of the lever 26 maintains the opaque flap 29 and the mirror A in their folded-back position by means of the finger 44 of the cam 43. The lever 64, which is constantly drawn by its spring 67 toward the abutment on the connecting-rod in its bottom position, keeps the eye-piece of the view-finder closed.

This closure of the view-finder eye-piece is a sign of the condition of the apparatus and indicates the need to rearm it in order to take another picture if the operator is either inattentive or was not previously conversant with the use of this apparatus.

When the operator actuates the arming lever 11 in order to move the film forward for another picture, the arming connecting-rod 4 is thrust back in the direction of the arrow 15. By turning the pinion 6, the toothed rack 5 arms the shutter and opens wide the diaphragm.

In the meantime, the sloping section 14 engages the roller 16 and moves this latter downwards, while the rocking arm 18 displaces the connecting-rod 24 in the direction 40.

The upward movement of the connecting-rod 24 acting in opposition to the spring 61 first causes the elbowed lever 26 to rotate in the direction 10 (FIG. 2), while the arm 49 of said elbowed lever returns to its top position and is thus permitted to come into abutment with 51.

This return movement is made possible by the lifting, due to the passage of the extremity of 49, of the lever 52–55 which is held in position elastically by the tension of the spring 59. This displacement of the lever 52 is not sufficient to actuate the lever 2.

During this rotation of the elbowed lever 26, the crank rod 34 compresses the spring 33, thus effecting the upward movement of the flap 29, the movement of which closes the image window 31. The said displacement of the flap 29 puts the spring 41 under tension and thus induces the upward movement of the mirror A, which is stopped in its view-finding position by the abutment 39 and is held in this position by the increased tension of the spring 41, which is, however, insufficient to check the action of the spring 33 on the flap 29. The cam 43 rotates with the flap 29 and its face 47 locks the rotation of the lever 76 by means of the projecting stop 81.

When the flap 29 has already closed the image window 31, the end of the upward movement of the connecting-rod 24, under the effect of the movement of the cam 14, actuates the rotation of the lever 64 which opens the window between the blades 69, 71 of the shutter of the eye-piece D.

At the end of the movement of rotation of 6, the end of the travel of the toothed rack 5 produces at the same time the opening of the shutter which was previously armed, for reflex view-finding. As view-finding again becomes possible, the operator is informed that the apparatus is ready for taking another picture.

The release of the lever 11 enables the arming connecting-rod 4 to return to its position, while the rocking arm 18 is freed and the connecting-rod 24 is held in position in spite of the tension of the spring 61, by means of the abutment of the lever arm 49 against the extremity 51 of the lever 52 which has returned to its position. The condition of the mechanism is again that of the diagram of FIG. 1.

The apparatus is ready for taking another picture. The mechanism of the present invention having effected, in their respective order, the co-ordination of the movements of connection between the arming lever 11 on the one hand and the release knob 58 on the other, of all the parts of the said mechanism, the distances of travel of these latter being correctly calculated for this purpose.

What I claim is:

1. In a single lens reflex camera, in combination, a wall formed with an exposure aperture through which film in the camera is exposed; an ocular located at an elevation higher than said aperture; a semi-transparent reflector having an operating position in front of said aperture extending across the optical axis at a 45° angle thereto; lens means having a lower portion beneath said reflector and an upper portion over said reflector, said lens means cooperating with said reflector and ocular for directing an image received by said reflector from the objective of the camera first down to said lower portion of said lens means and then back from said lower portion of said lens means up through said reflector to said upper portion of said lens means and from the latter to said ocular; shutter means located adjacent said ocular and having an open position permitting viewing of an image through said ocular and a closed position closing said ocular; a light shield closing said aperture and spaced from said reflector when said reflector is in said operating position, said light shield and reflector having a common turning axis located adjacent said wall beneath said aperture; means cooperating with said light shield and reflector for moving said light shield away from said aperture and said reflector away from its operating position to an inoperative position adjacent said lower portion of said lens means when an exposure is to be made; and means cooperating with said shutter means for placing the latter in said closed position when said reflector is in its inoperative position and for placing said shutter means in its open position when said reflector is in its operating position, whereby light cannot pass through said ocular to the interior of the camera when said reflector is in its inoperative position.

2. In a single lens reflex camera as recited in claim 1, said means for moving said shield and reflector acting directly on said shield and said shield transmitting movement to said reflector by engagement therewith; spring means cooperating with said shield and reflector for urging them toward each other around said common turning axis; and stop means cooperating with said reflector during movement of the latter and said shield away from said lower portion of said lens means for stopping said reflector in said operating position thereof while said shield continues to its position closing said aperture.

3. In a single lens reflex camera, in combination, a wall formed with an exposure aperture through which film in the camera is exposed; an ocular located at an elevation higher than said aperture; a semi-transparent reflector having an operating position in front of said aperture extending across the optical axis at an acute angle thereto; lens means having a lower portion beneath said reflector and an upper portion over said reflector, said lens means cooperating with said reflector and ocular for directing an image received by said reflector from the objective of the camera first down to said lower portion of said lens means and then back from said lower portion of said lens means up through said reflector to said upper portion of said lens means and from the latter to said ocular; shutter means located adjacent said ocular and having an open position permitting viewing of an image through said ocular and a closed position closing said ocular; a light shield closing said aperture when said reflector is in said operating position thereof; a pair of moving means one of which cooperates with said shutter means for moving the same between said open and closed positions and the other of which cooperates with said light shield and reflector for moving the same between said position respectively closing said aperture and extending across the optical axis and an inoperative position adjacent said lower portion of said lens means when an exposure is to be made; a pair of spring means respectively cooperating with said pair of moving means for actuating the latter to place said shutter means in said closed position and said light shield and reflector in said inoperative position; manually operable cocking means for arming the camera preparatory to making an exposure; and lever means actuated by said cocking means and actuating said pair of moving means in opposition to said pair of spring means for placing said shutter means in its open position and said shield and reflector in said position respectively closing said aperture and extending across the optical axis when the camera is armed.

4. In a single lens reflex camera as recited in claim 3, said cocking means including an elongated member which moves longitudinally during actuation of said cocking means and which has an inclined edge portion, said lever means having a portion engaged by said inclined edge portion of said elongated member to be moved thereby for actuating said lever means.

5. In a single lens reflex camera as recited in claim 4, said portion of said lever means being in the form of a freely rotatable roller.

6. In a single lens reflex camera as recited in claim 5, said roller having a grooved periphery receiving said edge portion of said elongated member and said edge portion being convexly rounded in transverse cross section.

7. In a single lens reflex camera as recited in claim 6, the part of said lever means which carries said roller being turnable about an axis parallel to said elongated member and said roller being inclined with respect to said elongated member during part of the movement of the latter and being coplanar with said elongated member during another part of said movement.

8. In a single lens reflex camera, in combination, a light shield movable between an upper shielding position and a lower non-shielding position; cam means fixed to said shield for movement therewith, said cam means being in a blocking position when said shield is in its upper position and a non-blocking position when said shield is in its lower position; operating lever means turnable in one direction for acting through said cam means on said shield to move the latter from said upper to said lower position and simultaneously move said cam means from said blocking to said non-blocking position; first spring means acting on said lever means to turn the latter in said one direction; diaphragm-setting lever means turnable from a rest position in one direction for setting the diaphragm of the camera and when in said rest position engaging said operating lever means to prevent movement thereof by said first spring means; shutter-release lever means turnable in one direction for releasing the shutter of the camera, said cam means when in its blocking position preventing turning of said shutter-release lever means in said one direction; second spring means urging said shutter release lever means in said one direction; and manually operable means cooperating with said diaphragm-setting lever means for turning the same in said one direction to set the diaphragm and simultaneously release said operating lever means to said first spring means, the latter then turning said operating lever means in said one direction to move said shield to said non-shielding position and to turn said cam means to said non-blocking position where it no longer blocks said shutter-release lever means which thereupon is turned by said second spring means for releasing the shutter of the camera.

9. In a single lens reflex camera as recited in claim 8, an ocular through which an image is viewed preparatory to making an exposure; shutter means having open and closed positions and cooperating with said ocular for respectively opening and closing the same; a lever operatively connected to said shutter means for closing the same when said lever turns in one direction; third spring means operatively connected to said lever for turning the same in said one direction; and an elongated blocking arm engaging said lever to prevent turning thereof in said one direction when said blocking arm is in a blocking position, said blocking arm being operatively connected to said operating lever means to be moved by the latter, when said operating lever means turns in said one direction, to a non-blocking position releasing said lever to said third spring means for moving said shutter means to said closed position closing said ocular, so that when said shield is in said lower non-shielding position thereof said ocular is closed by said shutter means.

10. In a single lens reflex camera as recited in claim 9, a semi-transparent reflector extending at an acute angle across the optical axis and located in front of said shield when the latter is in its shielding position; and lens means having a lower portion located beneath said reflector and an upper portion located over said reflector and said lens means cooperating with said reflector and ocular for directing an image first to said lower portion of said lens means, then back from said lower portion of said lens means through said reflector to said upper portion of said lens means and from the latter to said ocular, said shield when moving from said shielding to said non-shielding position engaging said reflector for moving the latter from said position extending across said optical axis to an inoperative position with said shield adjacent said lower portion of said lens means.

11. In a single lens reflex camera as recited in claim 10, spring means cooperating with said manually operable means for returning the latter to a rest position placing said diaphragm-setting lever means again in said rest position for preventing movement of said operating lever means by said first spring means, said manually operable means when returning to its rest position also returning said shutter-release lever means in opposition to said second spring means back to a rest position; cocking means for cocking a shutter of the camera; lever means linked to said arm and actuated by said cocking means for acting on said arm to move the latter in a direction turning said operating lever means in opposition to said first spring means to a position where said operating lever means again engages said diaphragm-setting lever means, said shield being returned to its shielding position by movement of said operating lever means in said opposite direction and said arm moving said lever connected to said shutter means in a direction which opens said shutter means in opposition to said third spring means during actuation of said cocking means.

References Cited in the file of this patent

UNITED STATES PATENTS

| | | |
|---|---|---|
| 2,311,822 | Frankel | Feb. 23, 1943 |
| 2,356,880 | Pignone | Aug. 29, 1944 |
| 2,550,698 | King | May 1, 1951 |
| 2,552,275 | Harvey | May 8, 1951 |

FOREIGN PATENTS

| | | |
|---|---|---|
| 933,132 | Germany | Sept. 15, 1955 |
| 1,012,436 | France | Apr. 16, 1952 |